(12) United States Patent
Numata (10) Patent No.: US 8,261,288 B2
(45) Date of Patent: Sep. 4, 2012

(54) APPLICATION PLATFORM

(75) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 12/421,374

(22) Filed: Apr. 9, 2009

(65) Prior Publication Data

US 2009/0288100 A1    Nov. 19, 2009

(30) Foreign Application Priority Data

May 13, 2008   (JP) ................................. 2008-126147

(51) Int. Cl.
*G06F 3/00* (2006.01)
(52) U.S. Cl. ....................................... 719/318
(58) Field of Classification Search .................. 719/310, 719/318; 715/700
See application file for complete search history.

(56) References Cited

U.S. PATENT DOCUMENTS

| | | | |
|---|---|---|---|
| 5,619,697 A * | 4/1997 | Nishida | 719/313 |
| 7,058,332 B2 | 6/2006 | Moroi | |
| 7,693,892 B2 * | 4/2010 | Koarashi | 707/704 |
| 7,739,606 B2 * | 6/2010 | Sawada et al. | 715/740 |
| 2004/0024607 A1 * | 2/2004 | Komatsu et al. | 705/1 |
| 2007/0168859 A1 * | 7/2007 | Fortes | 715/700 |

FOREIGN PATENT DOCUMENTS

| | | |
|---|---|---|
| CN | 1523459 A | 8/2004 |
| JP | 2006-172398 | 6/2006 |

OTHER PUBLICATIONS

Saul Greenberg, The Notification Collage: Posting Information to Public and Personal Displays, Mar. 31, 2001.*
CN Office Action issued on Sep. 8, 2011, in counterpart CN 200910142911.7

* cited by examiner

*Primary Examiner* — Lechi Truong
(74) *Attorney, Agent, or Firm* — Fitzpatrick, Cella, Harper & Scinto (57) ABSTRACT

An object is to provide an application platform in which, before a screen of an application is displayed, another application can display any screen by an optional determination standard. When the screen of a first application is to be displayed, if a second application exists monitoring a function of an image forming apparatus included in the first application, the second application is notified of the function information before the screen of the first application is displayed. Then, for realizing the above, the use function of the image forming apparatus is registered for each of the first applications, and the monitor function is registered for each of the second applications.

7 Claims, 12 Drawing Sheets

FIG.1

| APPLICATION ID | USE FUNCTION INFORMATION |
|---|---|
| 1 | Copy |
| 2 | E-mail, FAX |

FIG.2

| APPLICATION ID | MONITOR FUNCTION INFORMATION |
|---|---|
| 11 | E-mail |
| 12 | Copy, BOX |

| APPLICATION ID | MONITOR FUNCTION INFORMATION | FUNCTION |
|---|---|---|
| 11 | E-mail | FuncA() |
| 12 | Copy | FuncB() |
| 12 | BOX | FuncC() |

FIG.5

| APPLICATION ID | MONITOR FUNCTION INFORMATION | LEVEL |
|---|---|---|
| 13 | E-mail | Warning |
| 14 | Copy | Error |
| 15 | E-mail | Information |

| APPLICATION ID | USE FUNCTION INFORMATION |
|---|---|
| 1 | Copy |
| 2 | E-mail |
| 3 | FAX |
| 4 | Copy, E-mail |

FIG.10

| APPLICATION ID | MONITOR FUNCTION INFORMATION | FUNCTION | LEVEL |
|---|---|---|---|
| 16 | Copy | FuncD() | Information |
| 16 | Print | FuncE() | Information |

| APPLICATION ID | MONITOR FUNCTION INFORMATION | FUNCTION | LEVEL |
|---|---|---|---|
| 17 | E-mail | FuncF() | Warning |
| 17 | FAX | FuncG() | Warning |

FIG.14

FIG.15

APPLICATION PLATFORM

BACKGROUND OF THE INVENTION

1. Field of the Invention

The present invention relates to an application platform for carrying out interrupt display of a different application screen when an application screen is to be displayed on an image forming apparatus.

2. Description of the Related Art

When an application screen indicated by a user is to be displayed on an image forming apparatus represented by a multi function peripheral, prior to the display of the application screen indicated by the user, a different application screen is sometimes displayed. For example, when the application indicated by the user is going to display a copy screen, there is a case that a different application calculates the upper limit number of prints and the number of accumulated prints for the user, and displays the print record before the display of the copy screen.

On the other hand, there is proposed a technique to compare a security level and user's access authority defined for each application function and to display an authentication screen instead of the application screen when the user is not authorized to use the function (refer to Japanese Patent Laid-Open No. 2006-172398, for example).

However, the technique disclosed by above Japanese Patent Laid-Open No. 2006-172398 performs determination whether or not to display the authentication screen, in a platform part of the image forming apparatus. Therefore, it is actually impossible to display any desired application by a standard other than the access authority, since it is necessary to modify the platform part of the image forming apparatus. Further, the technique disclosed in Japanese Patent Laid-Open No. 2006-172398 has a configuration only capable of displaying a predetermined authentication screen.

SUMMARY OF THE INVENTION

The present invention has been made for solving the above problems and aims at providing an application platform capable of displaying any screen by a different application according to an optional determination standard before displaying an application screen to be displayed.

An application platform according to the present invention is the one on which a plurality of applications including a first application operates, and includes a receiving component receiving a display instruction for the first application, and a notification component notifying another application, which is requesting notification from the application platform, of function information associated with the first application, before the first application is allowed to display a display screen according to the display instruction received by the receiving component.

An application of the present invention is the another application having received the notification of the function information from the notification component of the application platform, and includes a response component responding to the application platform by sending a screen to be displayed on a display component before the display screen according to the display instruction received by the receiving component is displayed.

Development software of the present invention is the one for the application operating on the application platform, and includes a specification component specifying a function, execution of which a user can instruct when the first application displays the display screen, and an association component associating the function information, which identifies the function specified by the specification component, with the certain image.

A method of the present invention is a display control method by an application platform on which a plurality of applications including a first application operates, and includes a receiving step of receiving a display instruction for the first application, and a notification step of notifying another application, which is requesting notification from the application platform, of the function information associated with the first application, before the first application is allowed to display a display screen according to the display instruction received in the receiving step.

A computer-readable recording medium of the present invention includes a program recorded therein for causing a computer to execute the above method.

A program of the present invention causes a computer to execute the above method.

According to the present invention, prior to the display of the first application screen, the platform part notifies a second application, which is requesting to receive notification of the function used in the first application, of the function used in the first application. Thereby, the second application can display any screen by an optional determination standard.

Further features of the present invention will become apparent from the following description of exemplary embodiments (with reference to the attached drawings).

DESCRIPTION OF THE EMBODIMENTS

Hereinafter, a preferred embodiment for implementing the present invention will be described by use of the drawings.

Note that a constituent described in this embodiment is only an exemplification and is not intended to limit the scope of this invention thereto.

Figure 1:
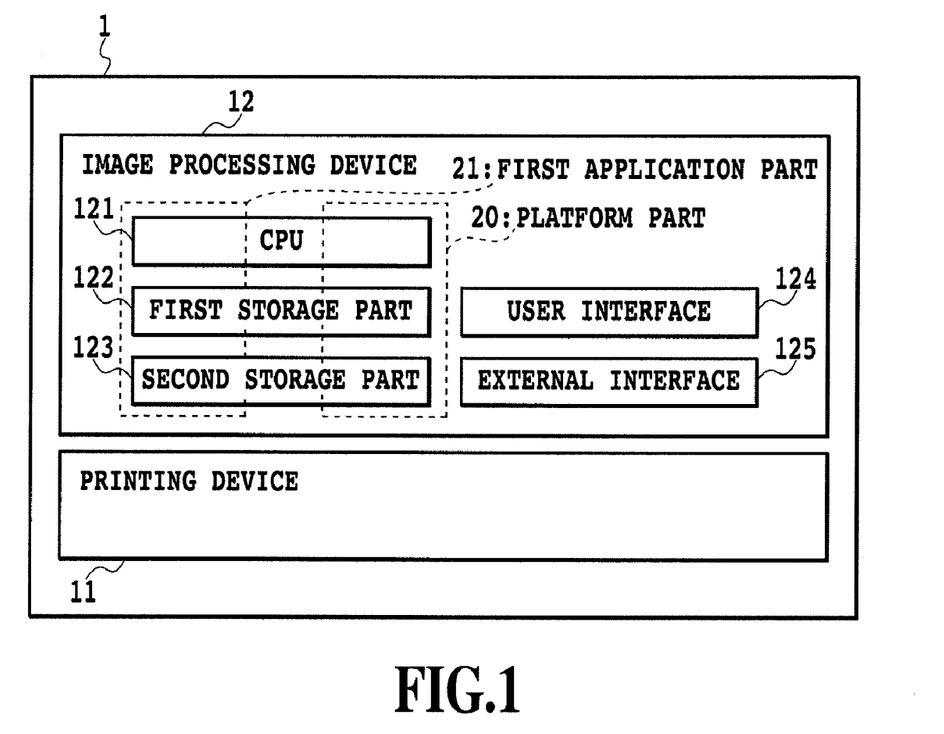
FIG. 1 is a block diagram showing a configuration example of an image forming apparatus.

FIG. 1 is a block diagram of an image forming apparatus in an embodiment of the present invention.

The image forming apparatus 1 includes a printing device 11 and an image processing device 12.

The image processing device includes a CPU 121, a first storage part 122 (e.g., RAM), a second storage part 123 (e.g., ROM or HDD), a user interface 124, and an external interface 125.

The first storage part 122 is a storage part directly exchanging data with the CPU 121, and the second storage part 123 is a storage part exchanging data with the CPU 121 via the first storage part 122. The first storage part 122 stores various application programs and platform programs.

The user interface 124 includes a keyboard, a mouse, a display, etc., and receives an instruction from a user and also displays data (screen data).

The external interface 125 performs data reception from an external apparatus and data transmission to the external apparatus. For example, the external apparatus includes an external storage device such as an external HDD and an external USB memory, another host computer connected via a network, and another image forming apparatus.

The CPU 121 can copy the platform program stored in the second storage part 123 to the first storage part 122. When having completed the copy, the CPU 121 goes into a state capable of executing the platform program. In the present embodiment, that the CPU 121 goes into a state capable of executing the platform program means that a platform part 20 is activated.

Note that, in the present embodiment, the platform part 20 has a configuration combining the following:

the CPU 121;

a storage area in the first storage part 122 which stores the platform program; and a storage area in the first storage part 122 or the second storage part 123, which stores a calculation result or the like obtained in the processing of the platform program by the CPU 121 or stores information necessary for the processing.

The platform part 20 can receive the first application program via the external interface part 125 and store the program into the second storage part 123. At this time, the platform part 20 determines and stores an ID indicating the first application program. In the present embodiment, to store the application program into the second storage part 123 and to determine and store the ID indicating the application program at the same time means to install the application program.

Further, in the installation of the first application program, the platform part 20 specifies use function information in a use function information file included in the first application program. Then, the platform part 20 registers the use function information to a use function information management table in association with the ID indicating the first application program.

Further, in the installation of the second application, the platform part 20 specifies monitor function information in a monitor function information file included in the second application program. Then, the platform part 20 registers the monitor function information to a monitor function information management table in association with the ID indicating the second application program.

The CPU 121 can copy the first application program stored in the second storage part 123 to the first storage part 122. After having completed the copy, the CPU 121 can execute the first application program. Note that, when executing the first application program, the CPU 121 uses a partial area in the first storage part 122 or the second storage part 123 (different area from the area storing the first application program) for a storage area storing a calculation result. In the present embodiment, to have the state of enabling the first application program to be executed means that the CPU 121 activates the first application program. Further, in the present embodiment, after the activation of the first application program, the CPU 121, the partial storage areas, and the area storing the first application program in the first storage part 122 compose the first application part 21.

By the above definition, the first application part 21 is generated when the CPU 121 copies the first application program stored in the second storage part 123 to the first storage part 122. Conversely, the first application part 21 is eliminated when the CPU 121 deletes the first application program, which is stored in the first storage part 122, from the first storage 122.

Next, there will be described processing of displaying the first application on the user interface part 124 of the image forming apparatus 1.

The platform part 20, when having received an execution instruction for the first application part 21 from a user via the interface part 124, sends the execution instruction to the first application part 21. The first application part 21, which has received the execution instruction, generates a display screen, and sends an instruction for displaying the generated display screen on the user interface part 124 to the platform 20. When having received the instruction, the platform part 20 displays the display screen on the user interface part 124.

Figure 2:
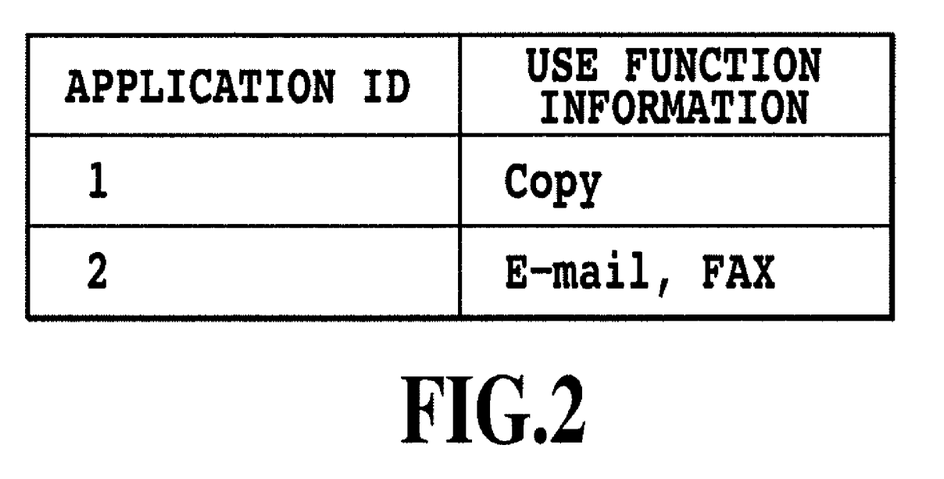
FIG. 2 is a diagram showing an example of a use function information management table.

FIG. 2 is a diagram showing the use function information management table stored in the platform part 20.

The application ID is an identifier for the platform part 20 to identify the application uniquely. The use function information is information for identifying a function of the image forming apparatus 1 to be used by the application. For example, FIG. 2 shows that the application having the application ID: 1 uses a copy function of the image forming apparatus 1. Further, FIG. 2 shows that the application having the application ID: 2 uses an E-mail function and a fax function of the image forming apparatus 1. That is, when one application uses a plurality of functions of the image forming apparatus 1, the use function information management table can store the use of the plurality of functions. Note that the record included in the use function information management table is not limited to this example.

Figure 3:
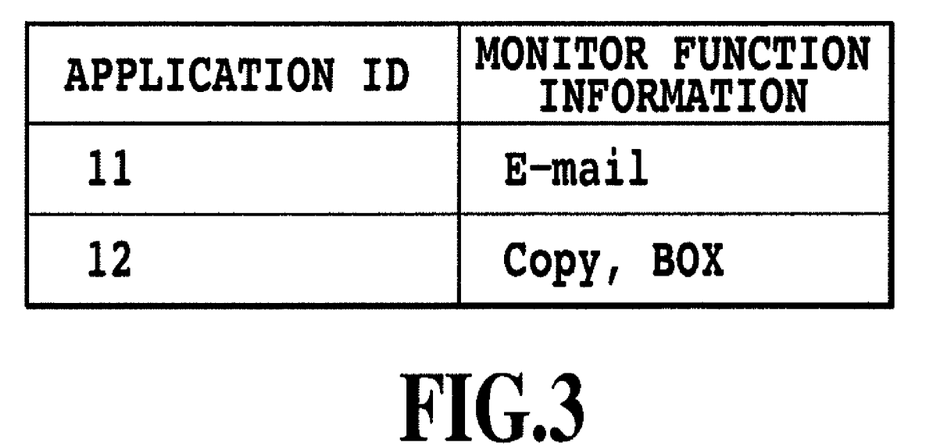
FIG. 3 is a diagram showing an example of a monitor function information management table.

FIG. 3 is a diagram showing a monitor function information management table stored in the platform part 20.

The application ID is an identifier for the platform part 20 to identify the application uniquely. The monitor function information is information for identifying a function to be monitored among functions of the image forming apparatus 1. For example, FIG. 3 shows that the application having the application ID: 11 monitors the E-mail function of the image forming apparatus 1. Further, FIG. 3 shows that the application having the application ID: 12 monitors the copy function and a box function of the image forming apparatus 1. That is, when one application monitors the plurality of functions of the image forming apparatus 1, the monitor function information management table can store the plurality of functions to be monitored. Note that the record included in the monitor function information management table is not limited to this example.

Next, a process flow of the present embodiment will be described by use of the flowchart shown in FIG. 4.

In S101, the platform part 20 receives an execution instruction for the first application from a user via the user interface part 124. Here, the execution instruction corresponds to a display instruction for displaying the first application on the user interface part 124 in order to execute the first application. After the display of the display screen, the platform part 20 performs association determination which determines whether or not the image forming apparatus 1 has the function information associated with the first application, from the use function information management table shown in FIG. 2, in S102. Then, the platform part 20 performs monitor determination whether or not there exists the second application which registers the function to be used by the first application as the monitor function information, from the monitor function information management table of FIG. 3, in S103.

If the second application does not exist, the platform part 20 sends the execution instruction to the first application in S110 as described above. The first application, which has received the execution instruction, instructs the platform part 20 to display the display screen on the user interface part 124 in S112, after having generated the display screen in S111. The platform part 20 sends the display instruction of the indicated screen to the user interface part 124.

On the other hand, if the corresponding second application exists in S103, the platform part 20 notifies the second application of the use function information in S104, before providing the first application with the execution instruction. For the notification method of the use function information, there is a method in which the platform part 20 invokes an interface function preliminarily determined for each function. Further, the second application may preliminarily register the interface function to be invoked for each monitor function as in the monitor function information management table shown in FIG. 5.

When having received the notification, the second application judges whether or not to display the second application before the first application, in S105. If the second application determines to carry out the displaying in S106, after generating a display screen in S107, the second application sends an instruction to display the display screen to the user interface part 124 for the platform part 20 in S108. An important point here is that the determination of the displaying and the generation of the display screen are performed not by the platform part 20 but by the second application. Thereby, whatever second application is born, it is possible to display any screen by an optional determination method of the second application without modifying the platform part 20 of the image forming apparatus 1.

The platform part 20 displays the screen indicated in S109 on the user interface part 124. If the second application does not provide the display instruction in S109, the platform part 20 sends the execution instruction to the first application as described above.

Next, the processing will be described for a case of having the plurality of second applications which register the function to be used by the first application as the monitor function information. Hereinafter, the above plurality of second applications will be called a second application group.

Figure 6:
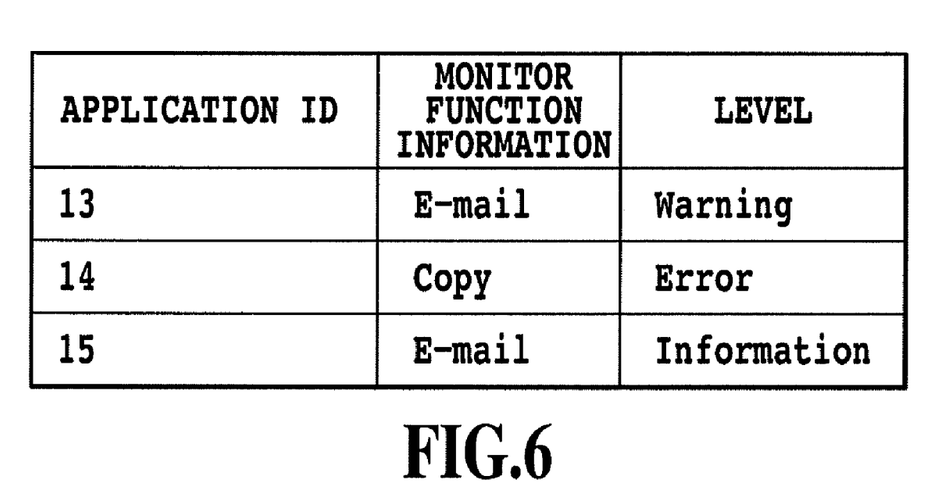
FIG. 6 is a diagram showing an example of a monitor function information management table registering levels.

FIG. 6 is a diagram showing the monitor function information management table stored in the platform part 20.

The application ID and the monitor function information are the same as those described in FIG. 3. FIG. 6 shows that the application having the application ID: 13 and the application having the application ID: 15 monitor the same E-mail function. The level is an index expressing processing priority in the second application group which registers the same monitor function information. FIG. 6 shows Error, Warning, and Information for the levels in an order from a higher level, and the platform part 20 provides the notification of the use function information and the display instruction to the user interface part 124 in the order from the higher level in the second application group. Further, while the present embodiment defines Error, Warning, and Information for the levels, the levels are not limited to these examples.

Figure 7:
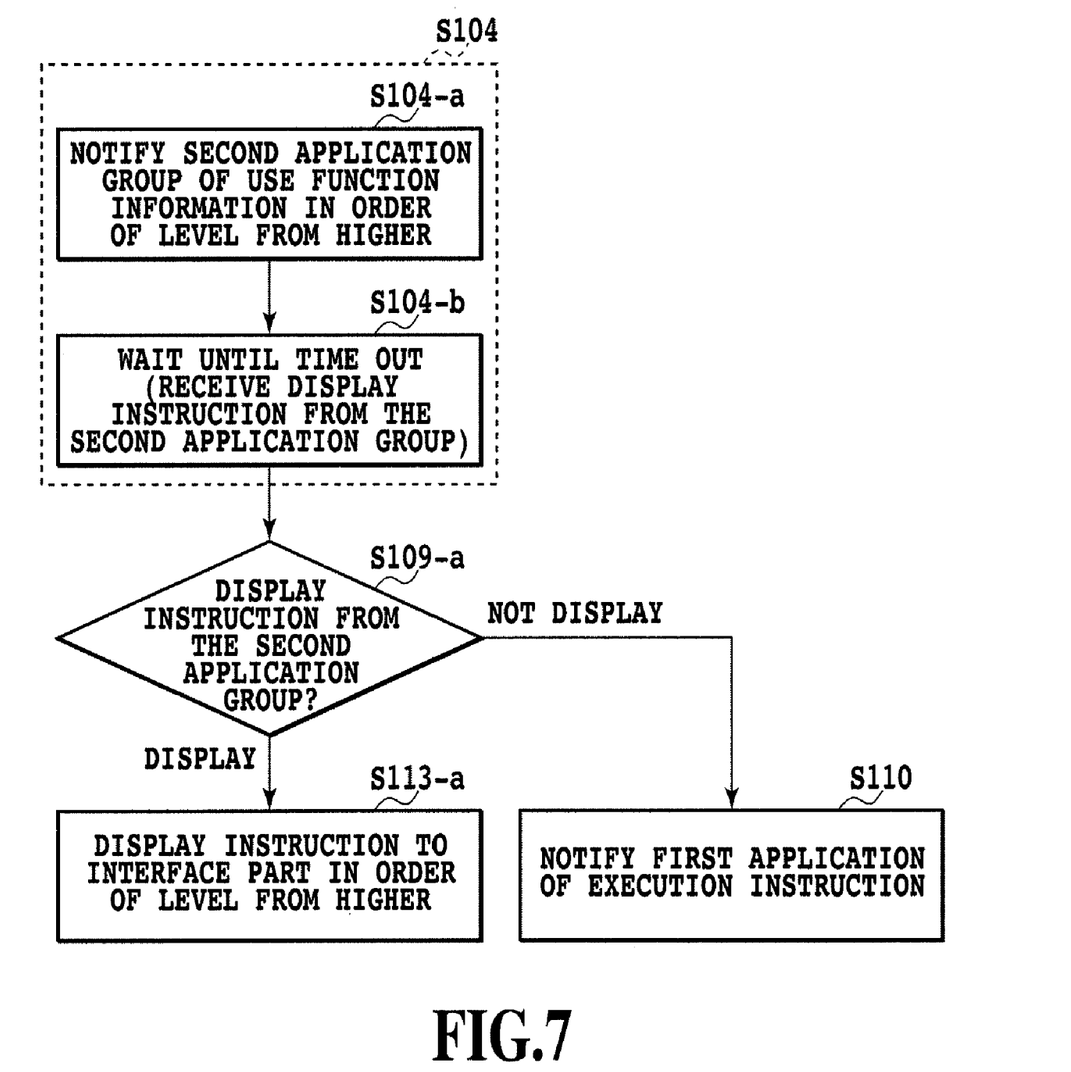
FIG. 7 is a flowchart showing an example of a process flow when there exists a plurality of second applications.

FIG. 7 is a processing flowchart for the platform part 20 when the plurality of second applications exists, which registers the function to be used by the first application as the monitor function information. The whole processing flow is the same as that shown in FIG. 4, and S104, S109, and S113 are described, which are different from those in FIG. 4.

Figure 4:
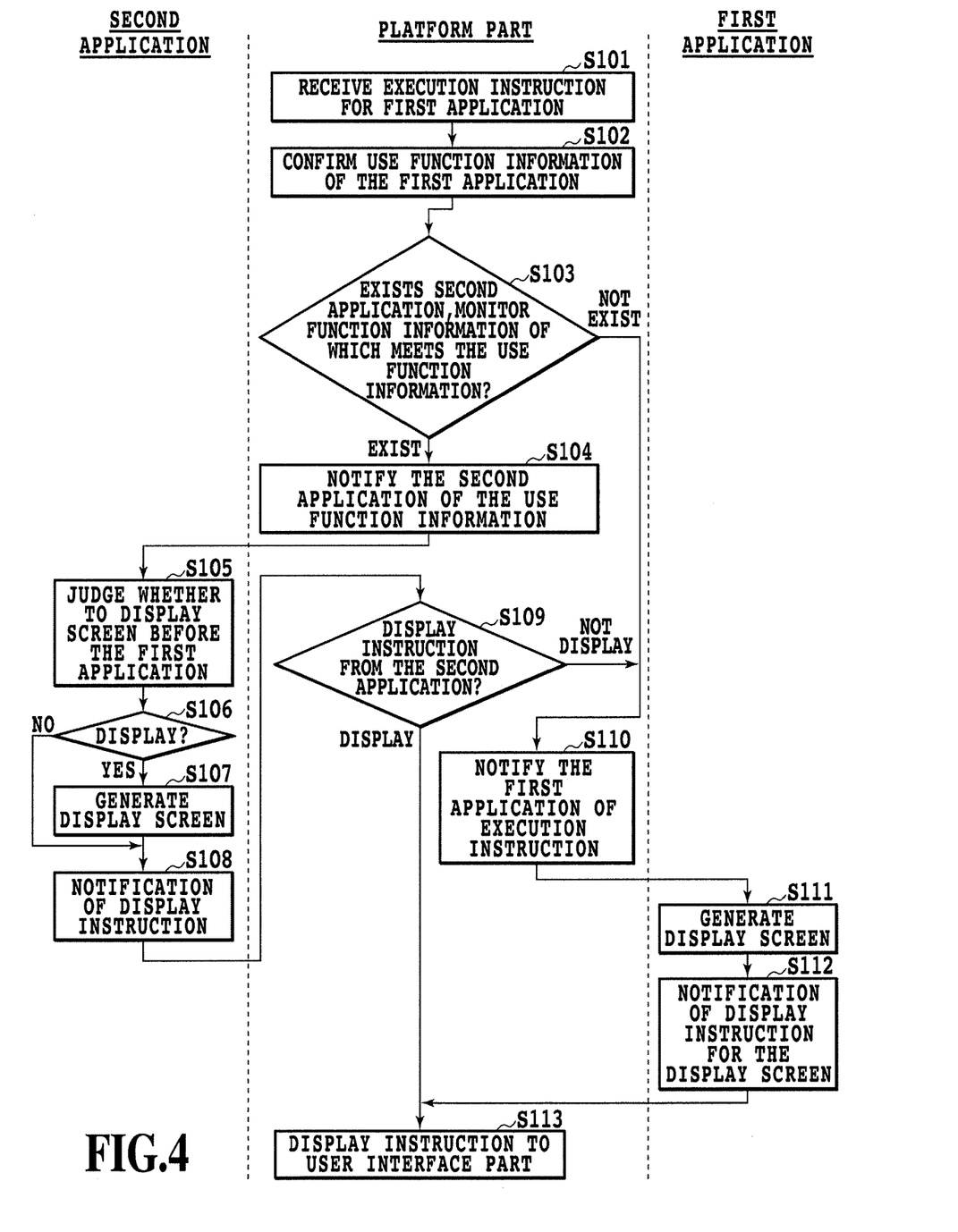
FIG. 4 is a flowchart showing an example of a process flow in the present embodiment.
Figure 5:
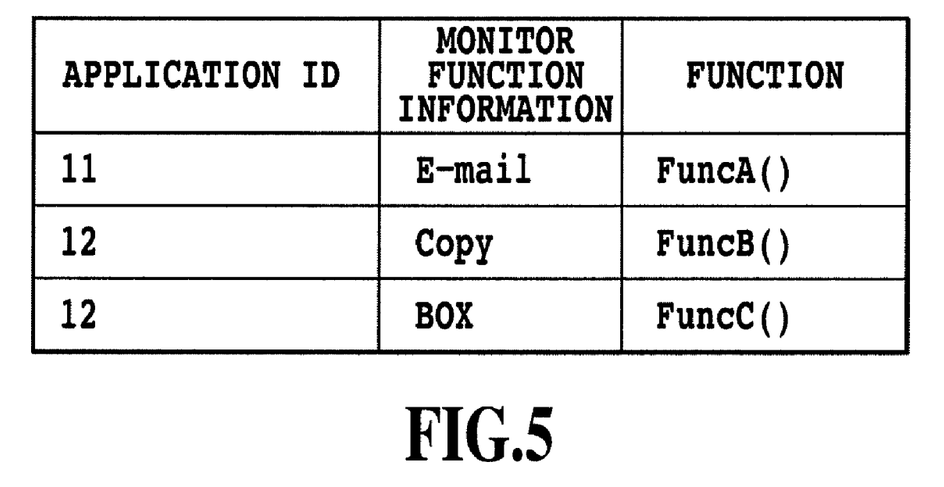
FIG. 5 is a diagram showing an example of a monitor function information management table registering a function for function information communication.

In S103 of FIG. 4, the platform part 20 determines whether or not there exists the second application which registers the function to be used by the first application as the monitor function information, from the monitor function information management table shown in FIG. 6. Then, if the corresponding plurality of second applications exists in S103, the platform part 20 notifies the second application group of the use function information in the order from the higher level in the monitor function information management table of FIG. 6, in S104-*a*.

The second application group, when having received the notification, instructs the platform part 20 to display the display screen on the user interface part 124 as needed, as in the flowchart of FIG. 4.

The platform part 20 waits for the display instruction from the second application group, which is the receiver of the notification, for a response waiting time within a certain time in S104-*b*. By providing the response waiting time, it is possible to have an effect of not interrupting the operation of the platform part 20, even when the second application group does not return a response from any reason. That is, when the second application group does not return the response, the platform part 20 carries out the display control to display the display screen according to the display instruction received from the first application. Further, for this method providing the response waiting time, the response waiting time may be provided not only for the case in which the plurality of second applications exists, but also for the process flow shown in FIG. 4.

Subsequently, the platform part 20 determines whether or not to have received the display instruction from the second application group, in S109-*a*. If the platform part 20 did not receive the display instruction from the second application group, or if the response waiting time has elapsed before the platform part 20 receives anyone display instruction, the platform part 20 sends the execution instruction to the first application in S110.

On the other hand, if the platform part 20 has received the display instruction from the second application group, the platform part 20 instructs the user interface part 124 to display the screen indicated in S113-*a* in the order from the higher level in the monitor function information management table of FIG. 6. Specifically, the user interface part 124 of the image forming apparatus 1 can retain a plurality of screens in a hierarchical structure and can display the screens to the user from the highest level of the hierarchical structure. Then, the platform part 20 orders the user interface part 124 to allot the screen indicated for display to the upper part of the hierarchical structure in the order from the higher level.

Next, the present embodiment will be described according to a first use case.

Figure 8:
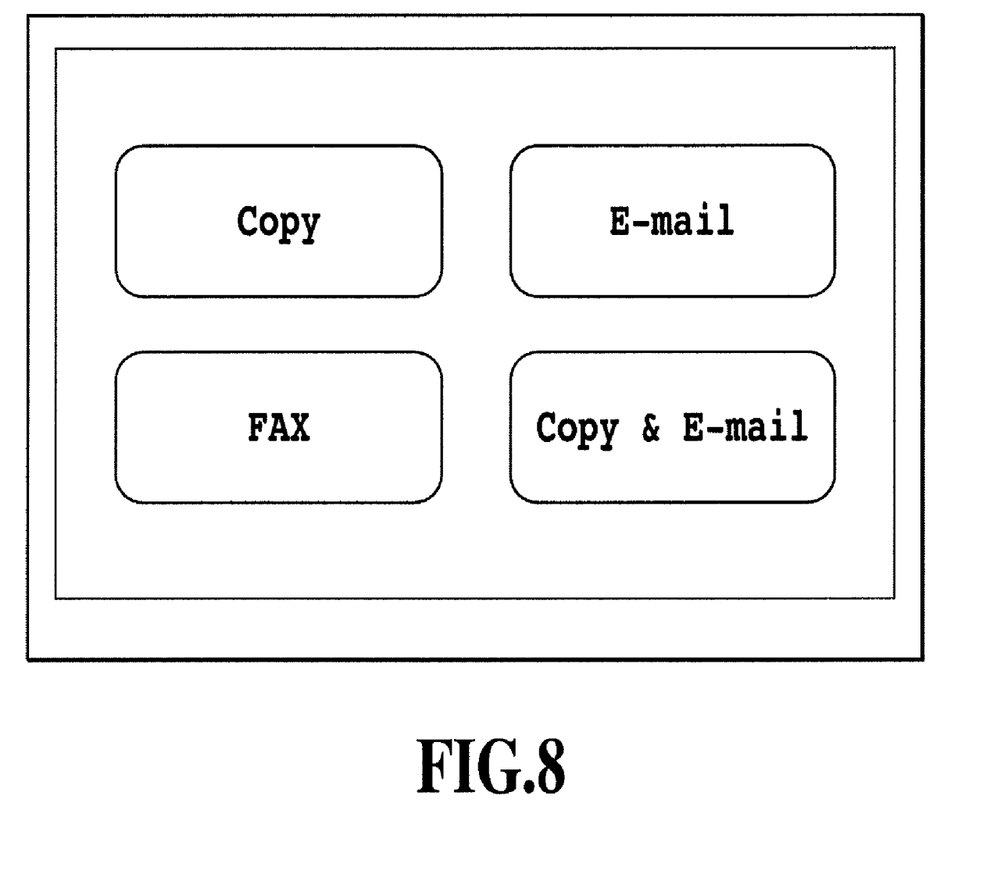
FIG. 8 is a diagram showing an example of a top screen in a user interface part.

FIG. 8 shows an example of a top screen to be displayed on the user interface part 124 of the image forming apparatus 1.

When a user pushes down an application displayed in the top screen, the user interface part 124 issues the execution instruction of the application to the platform part 20. The example of FIG. 8 shows respective buttons for a copy application carrying out copy, and an E-mail application carrying out E-mail transmission of a scan image. Further, the example also shows respective buttons for a fax application carrying out fax transmission of a scan image and a copy and E-mail application carrying out the scan image copy and the E-mail transmission thereof at the same time.

Figure 9:
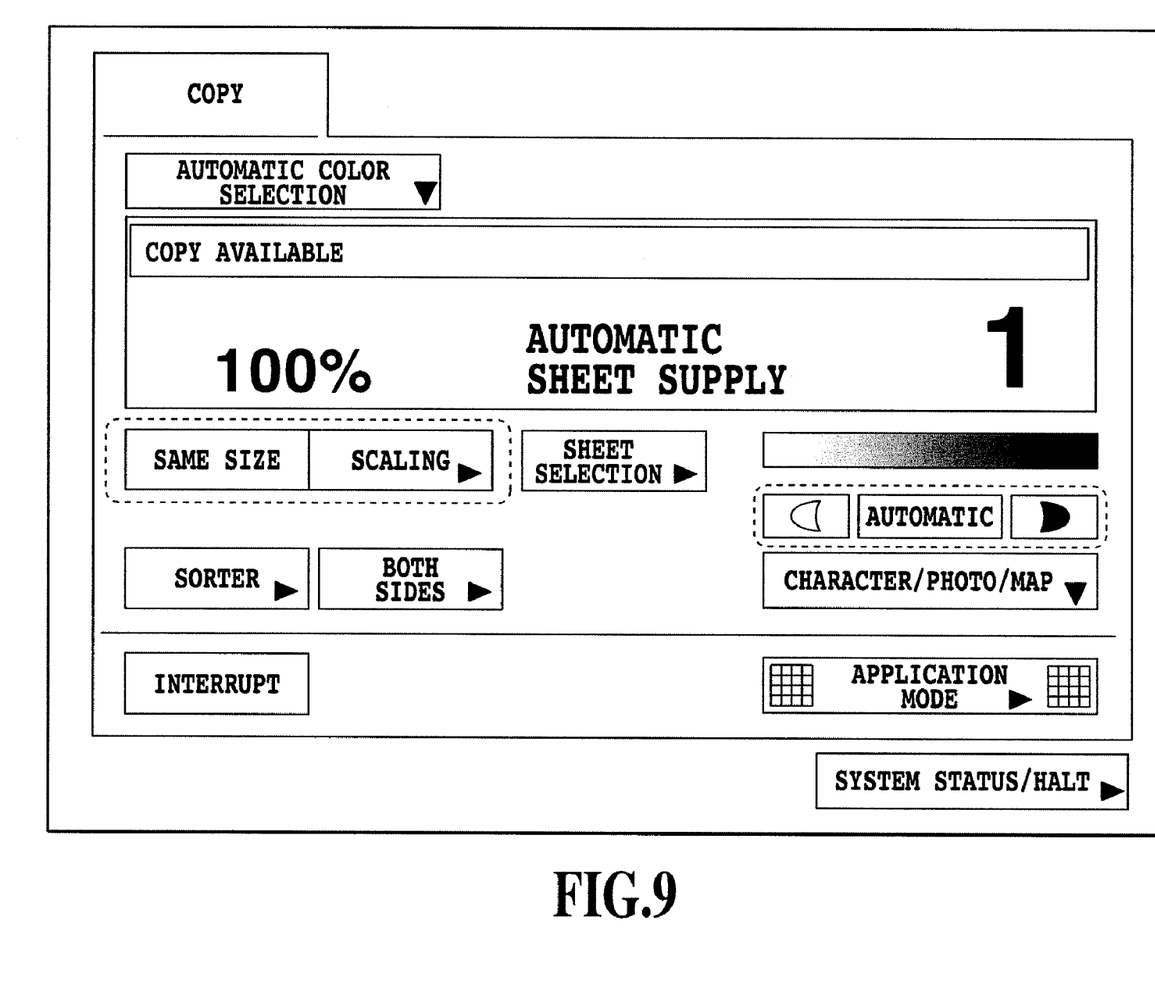
FIG. 9 is a diagram showing an example of a display screen for a copy application.

Typically, when the user pushes down the copy application button in the top screen, the user interface part 124 issues the execution instruction of the copy application to the platform part 20. Thereby, the copy application screen is displayed as shown in FIG. 9.

Figure 10:
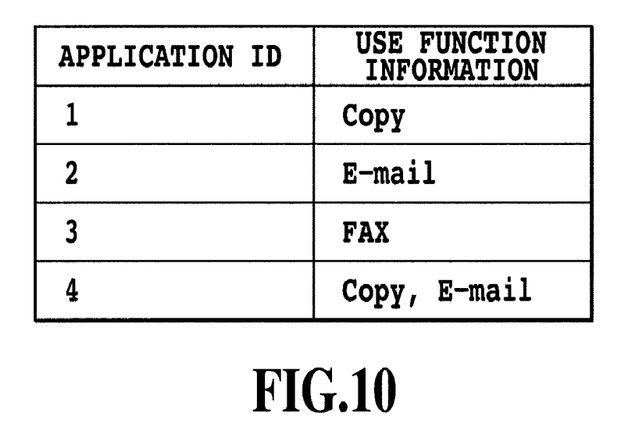
FIG. 10 is a diagram showing an example of a use function information management table in a first use case.

FIG. 10 is a diagram showing the use function information management table stored in the platform part 20 for the first use case.

The above copy application corresponds to the application ID=1 in FIG. 10, and Copy is stored as the use function information. Similarly, the E-mail application, the fax application, and the copy and E-mail application correspond to ID=2, ID=3 and ID=4, respectively. Since the copy and E-mail application uses two functions of the image forming apparatus 1, both of Copy and E-mail are registered as the use function information.

Figure 11:
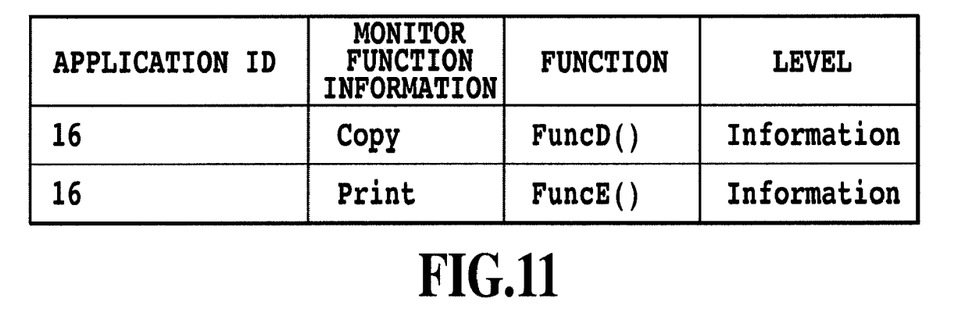
FIG. 11 is a diagram showing an example of a monitor function information management table in the first use case.
Figure 12:
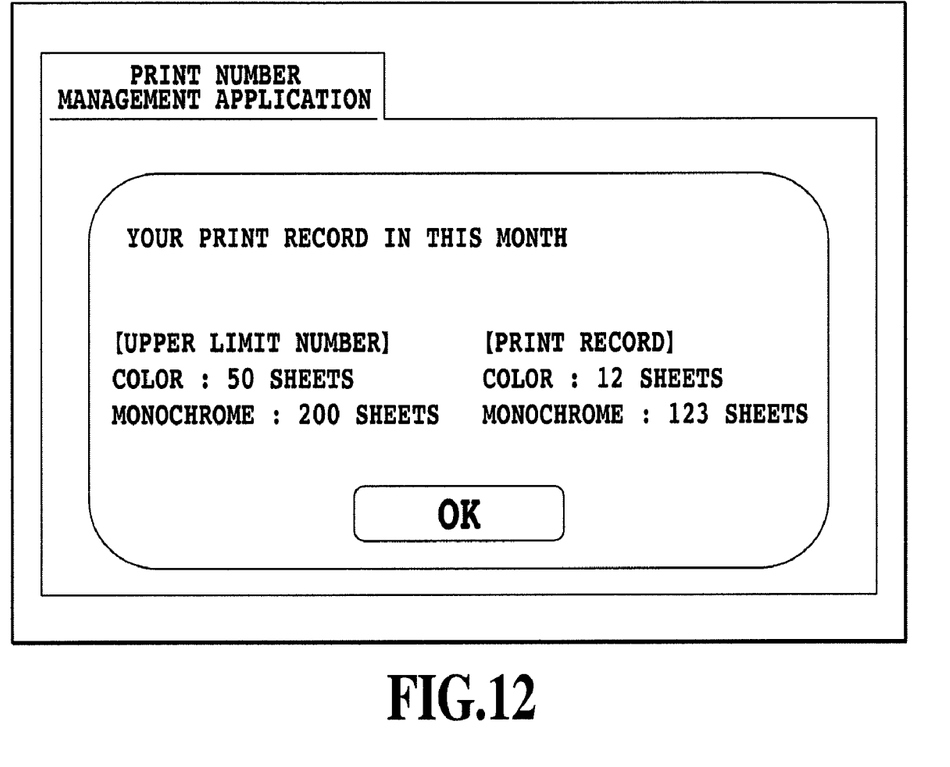
FIG. 12 is a diagram showing an example of a display screen for a print number management application.

FIG. 11 is a diagram showing the monitor function information management table stored in the platform part 20 for the first use case, and only one application is registered as the second application. For the first use case, a print number management application is exemplified as the second application. The print number management application is an application of calculating a print upper limit number and an accumulated print number for the user and of displaying the user's print record on the user interface part 124 as shown in FIG. 12. Further, the application has a function of prohibiting user's print when the accumulated print number exceeds the print upper limit number.

Figure 13:
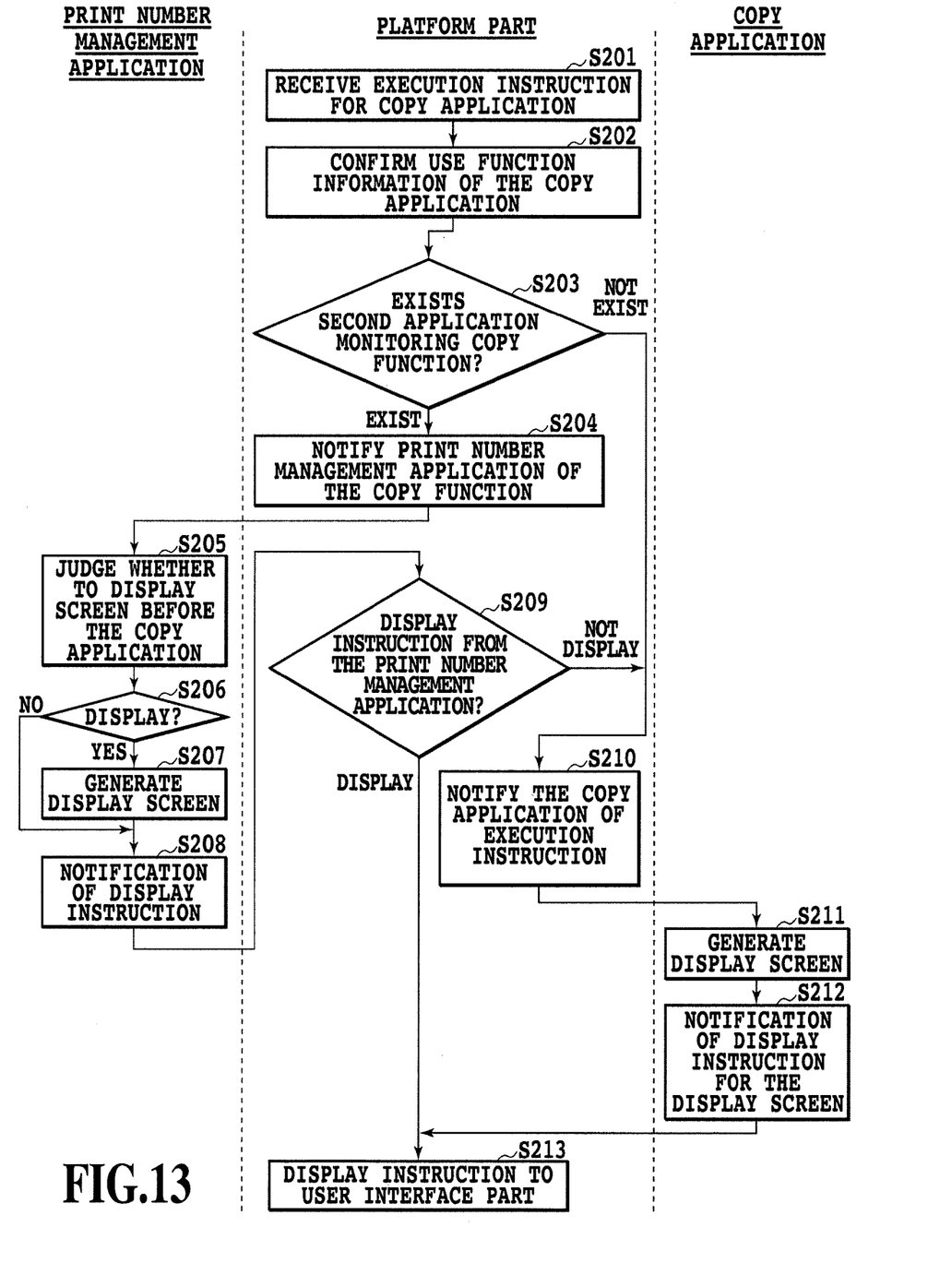
FIG. 13 is a flowchart showing an example of a process flow in the first use case.

FIG. 13 shows a processing flowchart in the first use case.

When the user pushes down the copy application in the top screen of FIG. 8, the platform part 20 receives the execution instruction of the copy application via the user interface part 124 in S201. The execution instruction here substantially corresponds also to the display instruction to display the copy application on the user interface part 124 for executing the copy application. Next, the platform part 20 specifies that the function to be used by the copy application (ID=1) in the image forming apparatus 1 is the copy function, from the use function information management table of FIG. 10, in S202. Then, the platform part 20 determines whether or not there exists the second application registering the copy function to be used by the copy application as the monitor function information, from the monitor function information management table of FIG. 11, in S203. Subsequently, the platform part 20 specifies that the print number management application (ID=16) exists, from FIG. 11. Then, the platform part 20 notifies the print number management application that the copy function is going to be executed, in S204.

The print number management application, when having received the notification, determines whether or not to display the screen of the print number management application before the copy application, in S205, and generates the display screen (FIG. 12) in S207 if the screen is to be displayed. Subsequently, the print number management application instructs the platform part 20 to display the display screen on the user interface part 124, in S208. While detailed description will be omitted for the determination method of the print number management application, the print number management application carries out own determination by a method such as one of acquiring user information from a server built on a network.

The platform part 20 displays the screen indicated in S209 (FIG. 12) on the user interface part 124. If not having received the display instruction from the print number management application in S209, the platform part 20 issues the execution instruction to the copy application.

In the first use case, the print number management application is notified before Copy or Print is executed by the user, and thus the print number management application can display the user's print record in advance. Thereby, the user can save the print number by changing a print format in the copy application or preliminarily increase the print upper limit number by using the function of the print number management application. On the other hand, when using the application not related to the printing such as FAX and E-mail, it is possible not to display the print record. Further, it is possible to display the print number management application in advance, not only for a specified copy application but also even for the application using the copy function made by 3rd Party.

Next, a second use case will be described.

In the second use case, the first application is the same as in the first use case and therefore the top screen (FIG. 8), and the use function information management table (FIG. 10) are the same.

Figure 14:
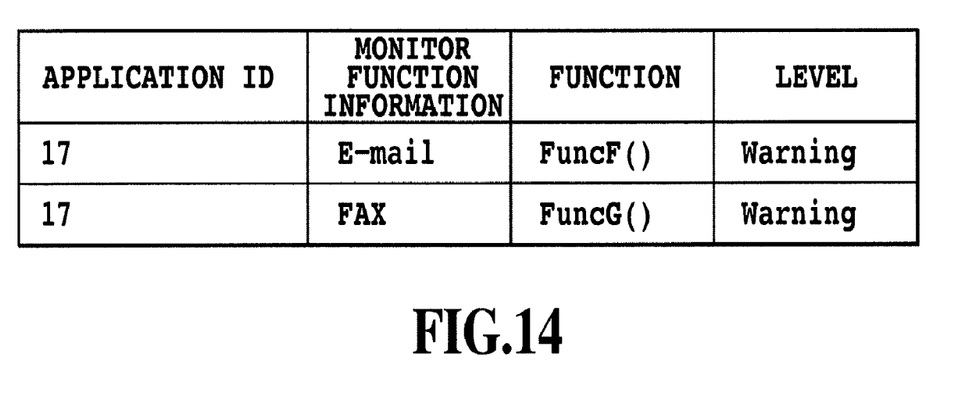
FIG. 14 is a diagram showing an example of a monitor function information management table in a second use case.

FIG. 14 is a diagram of the monitor function information management table stored in the platform part 20, and an authentication application will be exemplified as the second use case. The authentication application is an application of displaying an authentication screen on the user interface part 124 and carrying out user authentication, and the second use case registers E-mail and FAX as the monitor function information.

Figure 15:
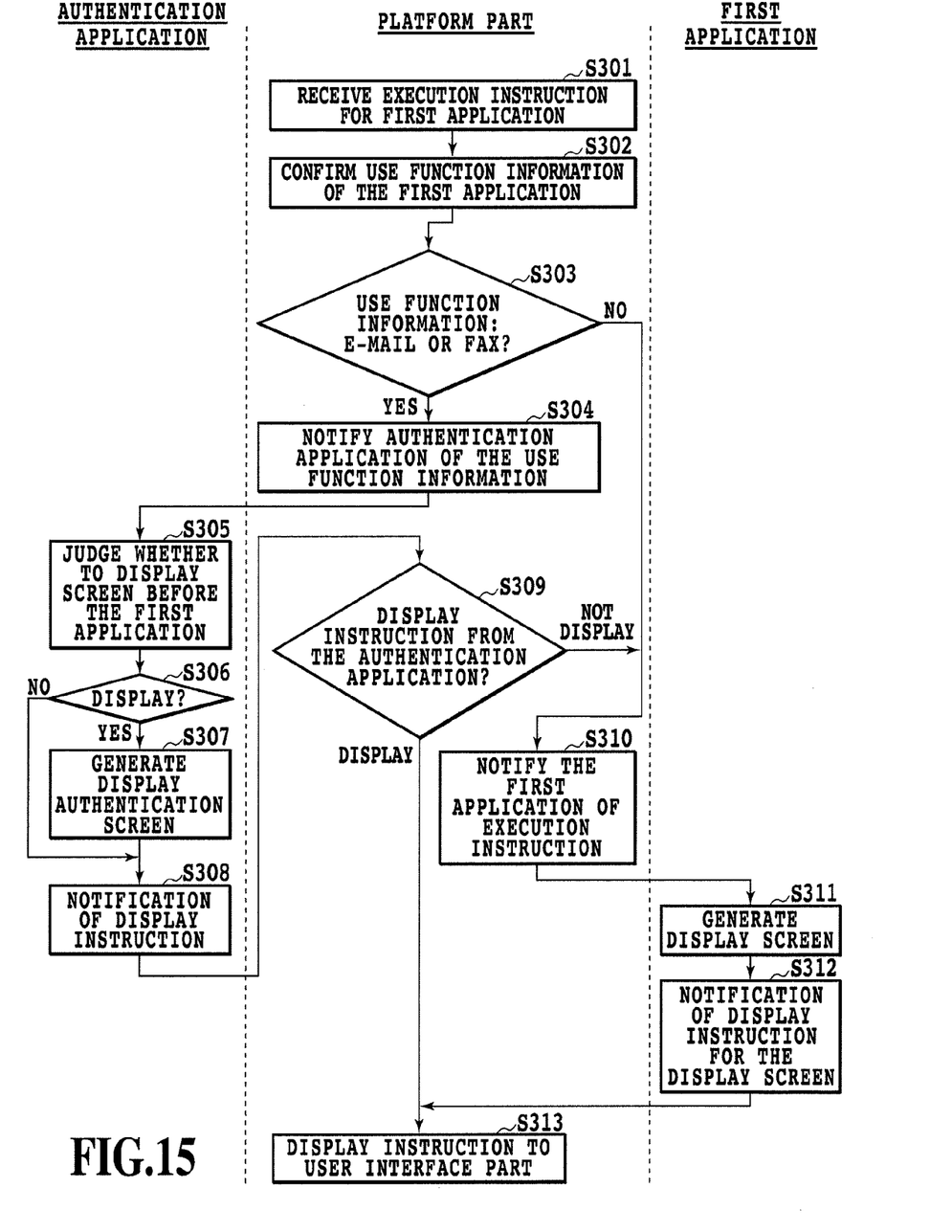
FIG. 15 is a flowchart showing an example of a process flow in the second use case.

FIG. 15 shows the processing flowchart in the second use case.

The platform part 20, when having received the execution instruction for the first application (S301), confirms the use function information of the first application (S302). When the use function information of the first application indicates E-mail or FAX, the platform part 20 notifies the authentication application of the use function information in S304. Then, the platform part 20, after having received the display instruction from the authentication application in S309, displays the authentication screen generated in S307 on the user interface part 124 in S313.

The second use case makes the authentication available according to the function of the image forming apparatus. For example, the user authentication is carried out with an emphasis on security in the case using E-mail or FAX, which is the function of sending information to the outside of a company, and the user authentication is not carried out in consideration of user friendliness in the case using Copy or Print. Further, in the second use case, it becomes possible to display the authentication screen having a different security strength for each of the functions. For example, in the authentication screen generation in S307, an IC card authentication screen is generated when the use function information indicates FAX, and in the case of E-mail, the IC card authentication screen is generated further requesting password input.

While the present embodiment specifies the use function information in the use function information file included in the first application program, it is considered sometimes to be a burden on an application developer that the developer creates the use function information file.

Accordingly, the following configuration is considered to be another embodiment; development software, which develops an application, analyzes a source code written in the application program and automatically generates the use function information file of the application program. This configuration can reduce the burden on the application developer by using the above development software.

In addition, the following configuration is also considered to be another embodiment; the platform part 20 analyzes the first application program and specifies the use function information of the application program when the first application is installed. This configuration can reduce the burden on the application developer even when the above development software is not used.

Similarly for the monitor function information, the present embodiment specifies the monitor function information in the monitor function information file included in the second application program. However, it is considered sometimes to be a burden on an application developer that the developer creates the monitor function information file. Accordingly, the following configuration is considered to be another embodiment; the development software, which develops the application, analyzes the source code written in the application program and automatically generates the monitor function information file of the application program.

In addition, the following configuration is considered to be also another embodiment; the platform part 20 analyzes the second application program and specifies the monitor function information of the application program, when the second application is installed.

The use function information in the present embodiment works as the information identifying the function, execution of which a user can specify via the display screen, when the application displays the display screen on the user interface part 124 as described above.

The monitor function information in the present embodiment works as the information for the platform part 20 to identify the function, execution of which may not preferably specified by the user before the notification to the second application, as described above.

Other Embodiments

The present invention can be achieved also by attaching a recording medium, which records a program code of software realizing the functions of the foregoing embodiments, to a system or an apparatus, and by a computer in the system or the like reading and executing the program code in the recording medium. The recording medium is a computer readable recording medium. In this case, the program code itself read out from the recording medium realizes the functions of the foregoing embodiments, and the recording medium recording the program code constitutes the present invention. Further, an operating system (OS) or the like operating on the computer may carry out a part of or the whole actual processing according to an instruction of the program code and realize the functions of the foregoing embodiments by the processing. Moreover, the program code readout from the recording medium may be written into a function extension card or a function extension unit of the computer, and then the function extension card or the like may carry out a part of or the whole processing according to the instruction of the program code to realize the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126147, filed May 13, 2008, which is hereby incorporated by reference herein in its entirety.

What is claimed is:

1. An application platform on which a plurality of applications including a first application operates, comprising:
   a processor and memory, cooperating to function as:
      a receiving component receiving a display instruction for the first application;
      an association determination component determining whether or not function information associated with the first application exists, before the first application is allowed to display a display screen according to the display instruction received by said receiving component;
      a monitor determination component, when said association determination component determines that the function information associated with the first application exists, determining whether or not there exists a second application group of a plurality of applications which monitors the function information;
      a notification component,
         when said monitor determination component determines that there exists the second application group which monitors the function information, notifying the second application group, and
         when said monitor determination component determines that there does not exist a second application group which monitors the function information, notifying the first application;
      a response awaiting component waiting for a response from the second application group which has been notified by said notification component;
      a display control component displaying the display screen according to the display instruction received by said receiving component on a display component, when said response awaiting component has not received the response from the second application group within a certain time; and
      an execution component executing instructions included in responses from the plurality of applications in an order according to levels respectively associated with the plurality of applications, when said response awaiting component has received the responses from the plurality of applications.

2. The application platform according to claim 1, wherein the response from the second application group contains a screen to be displayed on a display component, before the display screen according to the display instruction received by said receiving component is displayed.

3. The application platform according to claim 1, wherein the function information is information identifying a function of which a user can instruct execution and for which the first application displays the display screen according to the display instruction received by said receiving component.

4. The application platform according to claim 3, wherein execution of the function is instructed by a push-down of a button which appears in the display screen or sequential push-downs of buttons which appear in the display screen.

5. The application platform according to claim 1, the processor and memory further cooperating to function as:
   a specification component specifying a function, execution of which a user instructs after the first application displays the display screen; and an association component associating the function information identifying the function specified by the specification component with an image.

6. A method of display control by an application platform on which a plurality of applications including a first application operates, the method comprising:

a receiving step of receiving a display instruction for the first application, an association determination step of determining whether or not function information associated with the first application exists, before the first application is allowed to display a display screen according to the display instruction received in said receiving step;

a monitor determination step of, when it is determined in said association determination step that the function information associated with the first application exists, determining whether or not there exists a second application group of a plurality of applications which monitors the function information;

a notification step of, when it is determined in said monitor determination step that there exists the second application group which monitors the function information, notifying the second application group, and when it is determined in said monitor determination step that there does not exist a second application group which monitors the function information, notifying the first application;

a response awaiting step of waiting for a response from the second application group which has been notified in said notification step;

a display control step of displaying the display screen according to the display instruction received in said receiving step on a display component, when the response from the second application group has not been received within a certain time in said response awaiting step; and an execution component step of executing instructions included in responses from the plurality of applications in an order according to levels respectively associated with the plurality of applications, when the response from the plurality of applications have been received in said response awaiting step.

7. A non-transitory computer-readable storage medium storing a program for causing a computer to execute a method according to claim 6.

* * * * *